United States Patent [19]

Schüll et al.

[11] Patent Number: 5,767,231

[45] Date of Patent: Jun. 16, 1998

[54] METHOD OF PRODUCING NON-VITRIFIED PROCESSING AID LOW IN RESIDUAL MONOMERS FOR THERMOPLASTIC POLYMERS

[75] Inventors: Volker Schüll, Alzenau; Detlef Arnoldi, Weisenheim am Berg, both of Germany

[73] Assignee: Agomer Gesellschaft Mit Beschrankter Haftung, Hanau, Germany

[21] Appl. No.: 504,853

[22] Filed: Jul. 20, 1995

[30] Foreign Application Priority Data

Jul. 20, 1994 [DE] Germany .................. 44 25 625.6

[51] Int. Cl.⁶ .......................................... C08F 6/16
[52] U.S. Cl. ................. 528/502 E; 528/487; 528/491; 528/503; 526/329.7; 34/381
[58] Field of Search ................. 528/502 E, 487, 528/488, 491, 503; 526/329.7

[56] References Cited

U.S. PATENT DOCUMENTS 4,112,215  9/1978  Boessler et al. .................. 528/502
4,794,167  12/1988  Lindner et al. .................. 528/502

FOREIGN PATENT DOCUMENTS

A-0 581 009  2/1994  European Pat. Off. .
A-0 590 468  4/1994  European Pat. Off. .
A-27 23 377  12/1977  Germany .
A-41 18 526  12/1991  Germany .

*Primary Examiner*—Fred Teskin
*Attorney, Agent, or Firm*—Cushman Darby & Cushman IP Group of Pillsbury Madison & Sutro LLP

[57] ABSTRACT

A method for lowering the residual monomer content of non-vitrified processing aids for thermoplastic polymers involves subjecting an emulsion polymerizate containing methylmethacrylate and, optionally, up to 50% by weight of a comonomer to a post-catalysis step to reduce the residual monomer content followed by a spray-drying step where the residual monomer content is further reduced. The spray-drying step is performed at an exit temperature which is either above the boiling point of methylmethacrylate or if an optional comonomer is present which has a higher boiling point than methacrylate, at a temperature above the boiling point of the comonomer. The resulting product which is suitable for use as a non-vitrified processing aid has a residual monomer content of 100 ppm or less. The processing aid can be used with thermoplastics to form containers, e.g., beverage bottles of PVC, which would not adversely affect odor or taste of the contained food product.

9 Claims, No Drawings

METHOD OF PRODUCING NON-VITRIFIED PROCESSING AID LOW IN RESIDUAL MONOMERS FOR THERMOPLASTIC POLYMERS

BACKGROUND OF THE INVENTION

The invention is relative to a method of producing non-vitrified homo- or copolymerizates of methylmethacrylate-low-, in residual monomers in which a dispersion of an emulsion polymerizate of methylmethacrylate and, optionally, up to 50% by weight of a comonomer is produced, an emulsion polymerizate of polymethylmethacrylate and an amount of less than 5% by weight of a suitable comonomer obtainable in accordance with this method as well as to the use of the emulsion polymerizates as processing aids in thermoplastic polymers.

DESCRIPTION OF RELATED ART

Thermoplastic polymers such as e.g. PVC practically always contain processing aids which impart improved physical properties to the thermoplastic. A processing of the thermoplastic is only made possible by the processing aid, depending on the composition of the thermoplastic. Thus, the processing aids bring about better working properties, the melting and flow behavior are improved, the polymer and any added additives such as stabilizers, external and internal lubricants, fillers, adhesion promotors, co-stabilizers, impact-resistance enhancers, softeners, etc. can be homogenized better and more rapidly.

In particular, rigid polyvinylchloride (PVC) is frequently processed to formed parts such as e.g. plates, foils, tubes, foamed parts and formed bodies of very different shapes. However, rigid PVC in particular is difficult to process without processing aids because the thermoplastic tends to decompose before reaching the molten state already.

For this reason processing aids have long been known and used which are intended to improve the processing and antifriction properties of PVC and other thermoplastics. Thus, e.g. DE-OS 19 18 893 describes processing aids based on polyacrylate which are suitable for various thermoplastics in which a copolymerizate of longer- and shorter-chain alkylacrylates imparts anti-friction properties to the processing aid. This concerns a rubber-like polymerizate with unfavorable handling properties, the product tends to agglomerate in a concentration process, e.g. spray drying, and can therefore only be used in its solution. The same problems are also presented by a processing aid for PVC polymers described in DE-OS 21 23 384 which contains essentially acrylic ester with $C_4$-$C_8$ alcohols and up to 9% by weight acrylonitrile. The processing aid described is prepared by the polymerization of monomers in fatty alcohols which are intended to impart the necessary anti-friction properties to the thermoplastics for processing on calender rollers.

A similar processing aid is known from GB 981,116 which consists of a copolymerizate of methacrylates with short alcohol and acrylate units with somewhat longer alcohols. In PVC only the short alcohols ($C_1$-$C_4$) are desired as regards the acrylate component since otherwise the processing aid will become incompatible with the thermoplastic.

Short-chain processing aids based on PMMA are known from GB 1,347,287. These short-chain polyacrylates function as flow enhancers; however, they are less suitable for PVC processing on calender rollers since a too rapid caking of the thermoplastic to the calender rollers occurs.

Even multi-stage processing aids are described in patents and Offenlegungsschriften DE 16 94 409; 21 35 024; 41 25 477; EP 0,061,134; 0,184,851 and 0,367,198. According to what has been stated above, the known processing aids for thermoplastics, especially PVC, usually concern polymers or copolymers which can be obtained according to the method of emulsion-, suspensions-, or bulk polymerization.

The solid contained in the dispersions obtained in emulsion polymerization can be isolated out of them by means of methods such as spray drying, freeze-drying or coagulation and then supplied to its use as processing aid for thermoplastics.

Above and beyond the properties already mentioned, it is frequently necessary for processing aids to develop further properties in the thermoplastic, especially in PVC. Thus, processing aids are known to the expert in the art which exhibit additional lubricating action, e.g. DE 21 35 024 C2.

For special applications such as e.g. the manufacture of hollow bodies such as bottles or the like of PVC or other thermoplastic polymers processing aids must be nearly free of residual monomers in order not to adversely influence the odor or the taste of the liquids and drinks stored in the hollow bodies. See also: Market Development for PVC Mineral Water and Wine Bottles in Western Europe; Current Status and Projection for the Future; V. K. Sahajpal; Journal Vinyl Technology; 1989, vol. 11, No. 3, p. 115.

It is basically possible to remove the residual monomer either out of the polymerized dispersions directly or also out of the solid isolated out of the dispersions. Thus, it is taught in Ullmanns Enzyklopädie der technischen Chemie—(—Ullmann's Encyclopedia of Industrial Chemistry—)—, 4th ed., vol. 19, p. 15 that it is possible to lower the residual monomer content of polymerized dispersion by introducing water vapor and/or by adding defoamers at a reduced pressure. In other instances the content of residual monomers can be lowered by means of a subsequent addition of polymerization initiator and further heating of the dispersion (so-called post-catalysis). However, the lowering of the residual monomer content achievable with these methods is insufficient for the necessary low residual monomer values for using the processing aids obtained in beverage bottles of thermoplastic polymer, especially PVC.

It is also known that a diminution of the residual monomer content occurs during the spray drying of polymer dispersions. However, it is also not possible here either to lower the residual monomer content to the required low level.

DE 40 21 961 A1 describes a method of producing emulsion polymerizates poor in residual monomers in which method spray-dried emulsion polymerizates are post-treated with inert gas at temperatures between 30°–200° C. under constant mixing in a suitable container. The temperature of the inert gas thereby is 15°–50° C. above the softening temperature of the emulsion polymerizate. The mixing takes place in a fluid bed. If powdery emulsion polymerizates are treated for a rather long time at temperatures above the softening point, the sintering together of the individual powder particles is observed, which is known to the expert in the art as vitrification. This vitrification, which is not to be confused with the caking together of the entire heap of powder, results in rather poor properties of application of the emulsion polymerizate if it is to be used as processing aid for thermoplastic polymers, especially for PVC. The vitrification results in a poorer gelling of the PVC formulation, which is a very disadvantageous effect for the processing of rigid PVC recipes. Moreover, vitrified powder particles are frequently the cause of filler specks in the finished product, also a very undesired disadvantage.

SUMMARY OF THE INVENTION

In view of the state of the art presented, the invention therefore has the problem of indicating a method of producing a processing aid for thermoplastics, especially rigid PVC, which permits the production of a processing aid which exhibits in addition to the customary properties such a product should have—e.g. gelling of the hard PVC recipe, improving the rheological properties, and others—a very low residual monomer content, so that it is suitable for applications in which a too high residual monomer content adversely affects the odor or the taste, e.g. beverage bottles of PVC.

In addition, the method of producing the processing aid poor in residual monomers should be able to be performed with customary industrial means in an existing plant. No additional industrial auxiliary means should be needed which result in a lengthening of the production of the product and therewith to making the product more expensive. The invention also has the problem of indicating an emulsion polymerizate with very low residual monomer content and its use.

These problems and others not individually indicated are solved by a method of the initially cited type with the characterizing feature of subjecting an emulsion polymerizate containing methacrylate or a mixture of methacrylate and a comonomer (the comonomer can be present in amounts up to 50% by weight) to a post-catalysis treatment with a polymerization initiator and heat to lower the residual monomer content followed by spray drying at a temperature which is either above the boiling point of methacrylate or the comonomer if it is higher.

As a result of the fact that the emulsion polymerizate is first subjected to a post-catalysis in which the residual monomer content is lowered by means of the subsequent addition of polymerization initiator and heating, and the emulsion polymerizate is subsequently spray-dried at a temperature which is above the boiling point of methylmethacrylate or, if it is higher, above the boiling point of the optionally added comonomer, it is possible to prepare a product which can meet all requirements to be placed in particular on a processing aid for thermoplastic polymers and at the same time can be produced in a relatively simple process.

The invention succeeded in lowering the residual monomer content of the emulsion polymerizate to the required level by means of the combination of two different methods, each of which can be use alone for lowering residual monomers but which are not sufficient when used alone to achieve the low residual monomer contents required. This is achieved by means of post-catalysis of the dispersion resulting from the emulsion process and spray-drying at very high drying temperatures.

It could not have been readily foreseen that the combination of two methods for reducing the monomer content of emulsion polymerizates which were known by themselves would lead to a useable result.

Thus, this combination of method steps results e.g. in commercially available PVC processing aids in a vitrification of the spray-dried emulsion polymerizates since the drying temperatures necessary for this result in a vitrification of the powders at an elevated exit temperature if the drying temperatures are above the softening temperature.

However, if the exit temperature remains below the softening temperature during the spray drying, that is, the highest temperature used, it is not possible in many instances to assure a sufficient effect of removing residual monomers. It is therefore especially preferred that the spray drying is carried out at a temperature which is above the boiling point of methylmethacrylate or, if it is higher, above the boiling point of any comonomer present (relative in each instance to the normal pressure of 1013 hPa).

This effect plays an important cart especially when comonomers are used to produce a methylmethacrylate copolymer.

All vinylically unsaturated compounds suitable for the purpose of producing a copolymerizate and familiar to an expert in the art can basically be considered as comonomers for the copolymerization with MMA.

In a preferred method variant of the invention a comonomer is used whose boiling point under the normal pressure of 1013 hPa is below the glass-transition temperature of the copolymerizate.

If the boiling point of the comonomer is below the glass-transition temperature of the copolymer a vitrification of the copolymer can be avoided during the spray drying with simple means.

The interval between the glass-transition temperature of the copolymerizate and the boiling point of the comonomer is also of interest in this connection.

Thus, it is furthermore particularly advantageous to use a comonomer with a boiling point of (Tg–X) (° C.) in which Tg is the glass-transition temperature of the copolymerizate in C and the numerical -value of X>5, preferably>10 and especially preferably>20.

Thus, a relatively large temperature difference of more than 20° C. is especially desirable for the invention.

According to the invention the lowest [very low] residual monomer contents can be realizes for such a coordination of comonomer boiling point and Tg of the copolymerizate.

However, not only this temperature interval can play a part for the invention but the difference between the spray-drying exit temperature and the Tg of the polymerizate can also have a significance for homo- and copolymerizates.

Thus, it is preferred in a further advantageous method modification in accordance with the invention that the spray drying is carried out at a spray-drying exit temperature of (Tg–Y)(C) in which Tg is the glass-transition temperature of the homo- or copolymerizate in C and the numerical value of Y is between 2 and 30, preferably between 5 and 15.

Therefore, a system is optimal for the invention and consequently also quite especially preferred in which the glass-transition temperature of the polymerizate to be dried is between 2° and 30° C. above the temperature at the exit of the spray drying and in as far as the residual monomer is to be removed from a copolymerizate, the comonomer simultaneously exhibits a boiling point under normal pressure which is more than 20° C. below the glass transition temperature of the copolymerizate.

The polymerizates with low residual monomer content in accordance with the invention are emulsion polymerizates.

Normally, slightly water-soluble monomers are used for the emulsion polymerization itself; however, water-soluble monomers such as acrylamide, methacrylic acid, hydroxyethylmethacrylate and others can also be polymerized and copolymerized. Furthermore, water-soluble radical formers such as sodium peroxodisulfate or also water-soluble azo initiators or water-soluble peroxides and hydroperoxides are applicable. These radical formers are frequently used together with reducing agents such as sodium sulfite, sodium formaldehyde sulfoxylate or others. In order to control the polymerization heat various feed methods are used such as emulsion feed, monomer feed, separate feed of monomer and other auxiliary agents such as emulsifiers. State of the art are also batch methods and seed latex methods. These methods are used, among other things, to be better able to control the polymerization heat being released but also to e.g. adjust the particle size of the dispersion particles. For the emulsion polymerization emulsifiers and dispersion agents are also needed. Cationic, anionic, amphoteric and non-ionic surfactants are usual for this. Products such as alkali salts of longer-chain fatty acids, alkyl sulfates, alkyl sulfonates, alkylated aryl sulfonates, alkali salts of sulfosuccinic acid or others can be cited as examples thereof. Further auxiliary agents such as sodium hydroxide, buffers, rheological additives, stabilizers are possible and used by the expert in the art in accordance with the desired effect. Depending on the desired property of the dispersion or of the solids to be isolated, the raw materials described above are combined with each other and polymerized according to one of the above-mentioned methods or combinations of the same. The polymerization temperature can be adjusted between 40° and 95° C. The polymerization can be carried out with or without pressure.

Typically, dispersion particles with an average particle diameter of 40–500 nanometers are obtained. Other particle sizes are possible.

Many further details can be gathered e.g. from: Polymer Colloids; Elsiever Applied Science Publishers London and New york; R. Buscall, T. Corner, J. F. Stageman.

The post-catalysis method, which is important for the invention, is general state of the art. Specifically, it has proven to be useful within the framework of the invention to carry out the post-catalysis in the following manner. After the end of the monomer feed or emulsion feed the dispersion is heated another 0.5 h at 90° C. under agitation. Then, the initiator sodium peroxodisulfate, dissolved in water, is added all at once to the dispersion. The mixture is further heated at 90° C. and the agitation continued until the desired effect of lowering of residual monomers has occurred. See ex. 5, table 3. Further descriptions of the post-catalysis are to be found in Ullmann's Enzyklopädie der technischen Chemie, 4th ed., vol. 19, page 15.

A lowering of the residual monomer content to 1000+100 ppm is generally possible by the single step of post-catalysis.

The method of spray drying is known in the literature. It is to be preferred for the invention since a favorable powder morphology is achieved by spray drying. The spray-dried powder particles disintegrate during the processing due to the influence of shearing and temperature into the primary particles. As a result thereof, the processing aids can be easily worked into thermoplastics.

The combination of post-catalysis and spray drying is preferably carried out in such a manner according to the invention that the polymerizates to be treated exhibit a residual monomer content ≦100 ppm, preferably ≦50 ppm and especially preferably ≦30 ppm.

It has furthermore proved to be advantageous within the framework of the invention to perform the post-catalysis for at least 0.5 h, preferably up to 3 h and especially between 0.75 and 2 h.

If the time drops below 0.5 h, the maximum low residual monomer content is not achieved. If a time of 3 h is exceeded, no further lowering of the residual monomer values is observed any more.

Further subject matter of the invention is constituted by a non-vitrified, spray-dried emulsion polymerizate of polymethylmethacrylate with a comonomer content of less than 5% by weight relative to the total weight of the copolymerizate which can be obtained according to a method described herein and is characterized by a residual monomer content of less than 50 ppm and preferably of less than 30 ppm.

It was possible for the first time with the method of the invention to make available a simultaneously spray-dried and non-vitrified emulsion polymerizate with the above-cited specification. Vinylically saturated monomers can be considered as comonomers for producing the emulsion polymerizate. The preferred comonomers include, among others, methylacrylate, ethylacrylate, n-butylacrylate, ethylmethacrylate and n-butylmethacrylate.

The polymerizates (homopolymerizates and copolymerizates) poor in residual monomers and in accordance with the invention are especially suitable as processing aids for thermoplastic polymers, primarily for thermoplastic PVC. Viewed as a whole, it was surprising for the invention that an emulsion polymerizate with a glass-transition temperature which is distinctly higher than the commercially obtainable PVC processing aid nevertheless develops a good activity as PVC processing aid. This is especially all the more true because it is basically not possible to set the glass transition temperature of the PVC processing aid higher and higher in order to make possible in this manner higher and higher drying temperatures in the spray drying. PVC is a thermoplastic which must be processed at the lowest possible melting temperatures in order to avoid thermal degradation of the polymer during the processing. Usually, a first measurable flow of polymer melts is observed 50 K above the glass temperature of the polymerizate. That means that the glass transition temperature of a PVC processing aid must not be adjusted too high since there is otherwise the danger that it does not melt in the PVC melt and can not become active then.

The fact that one succeeded in developing a PVC processing aid with sufficiently low residual monomer content by means of a novel combination of different known methods of residual-monomer lowering was surprising since, in particular, no further additional industrial devices are necessary for the combination of the two methods. This was initially not to be expected. In particular, it was not to be expected that the individual method steps can be combined with each other so advantageously that no vitrification of the powders of the emulsion polymerizates occur during spray drying.

DESCRIPTION OF THE PREFERRED EMBODIMENT

The invention is explained in more detail in the following using examples.

EXAMPLE 1

Production of an emulsion polymerizate suitable as PVC processing aid. 1452 g demineralized water are placed into a glass reactor with a volume of 5 l and heated under agitation and an atmosphere of inert gas to 86.5° C. Then, a 5% aqueous solution of sodium peroxodisulfate is placed into the reactor. Then, an emulsion of 1076 g demineralized water, 2250 g methylmethacrylate, 250 g n-butylmethacrylate, 76.7 g diisooctylsulfosuccinate (as 75% aqueous solution) is allowed to run into the reactor in the following manner and polymerize: 10 minutes 14.3 g/minute and 117 minutes 29.9 g/minute. After the end of the feed the mixture is heated 30 minutes more under agitation at 90° C. The dispersion which is then present has -solids-content of 49.1%, a particle size of 237 nanometers, a pH of 3.6 and a coagulate portion of 8 g (including cakings in the reactor).

This dispersion is spray-dried in a commercially available spray drier at 160° C. entry temperature and 70° C. exit temperature. The powder obtained in this manner has a viscosity number of 381 ccm/g, a glass temperature of 120° C. and a bulk density of 463 g/l. An expert in the art can produce a plurality of different homo- and copolymers from other acrylic, methacrylic monomers or also styrene and styrene derivatives or also vinyl ether derivatives or vinyl ketones or vinyl aromatics in accordance with this method or this method slightly modified. This is known and does not have to be further explained. For the further elaboration of the invention copolymers were produced from methylmethacrylate and n-butylmethacrylate and investigated. These products were subjected to various methods of residual-monomer lowering and spray-dried under various conditions in order to obtain the lowest possible residual monomer contents in the powdery emulsion polymerizate. The details are described in the following.

EXAMPLE 2

A dispersion of methylmethacrylate was prepared analogously to the method described in example 1 with a viscosity number VZ=308 ccm/g and a particle size of 219 nm. The solid content of the dispersion was 50.1%. This dispersion was subjected without further treatment to the residual monomer lowering of spray drying in order to isolate the emulsion polymerizate as powder. Details about the spray-drying method can be gained from the source: Spray Drying Handbook, third edition; K. Masters, George Goodwin Ltd. London; J. Wiley and Sons New York. The concepts entry temperature and exit temperature employed in the following are the temperatures of the drying air upon entry into the spray tower and upon exiting from the stray tower.

The spray-drying experiments were carried out in a commercially available spray drier. The tests were carried out with a spray disk at a rate of rotation of 15000 rpm. The throughput of dispersion was between 10 l/h and 25 l/h. The drying temperature are indicated in the particular examples.

The dispersion of example 2, whose residual methylmethacrylate content was 1962 ppm, was subjected to the drying conditions indicated in table 1. It can be seen that the emulsion polymerizate of example 2 isolated as powder has a residual monomer content which is not sufficiently low. The flow time of the more highly dried powder is not different from that of the powder dried at a low temperature. REM photographs show that both powder specimens are non-vitrified.

EXAMPLE 3

A dispersion of methylmethacrylate is produced in accordance with the method described in example 1 which exhibits the following properties: Viscosity number 261 ccm/g, particle size 178 nm, viscosity 12 cP and a solid content of 45.7%. This dispersion was post-heated 1 hour with 0.016% by weight sodium peroxodisulfate (relative to the solid content of the dispersion) at 90° C. and under agitation. This process is designated in the following as post-catalysis. The residual monomer content of the dispersion was then 975 ppm methylmethacrylate. If this dispersion is subjected to the spray-drying condition of example 2, it can be seen that the residual monomer content of the powdery, spray-dried emulsion polymerizates achieves the desired low values at rather high exit temperatures. It is apparent from table 1 that post-catalysis alone—example 3—does not sufficiently lower the residual monomer content of the dispersion. This shows that in order to obtain very low residual monomer values a combination of two methods of residual-monomer lowering in a supplementary manner is necessary to achieve the lowest possible residual monomer values.

EXAMPLE 4

A dispersion of methylmethacrylate was produced according to the method described in example 1 which exhibited the following properties: Viscosity number 290 ccm/g, particle size 184, solid content 49.2%. This dispersion was post-catalyzed with 0.1% by weight (relative to solid content) sodium peroxodisulfate. The post-catalysis lasted 3 h at 90° C. under agitation. It can be gathered from table 2 that an increase of the concentration of sodium peroxodisulfate does not result in a lower residual monomer content but rather exhibits the disadvantageous effect that the amount of coagulate increases. This becomes understandable by means of the action of sodium peroxodisulfate as electrolyte.

TABLE 2

| Example | Residual MMA content (ppm) | Coagulate (or solid) (% by weight) |
| --- | --- | --- |
| 3 | 975 | 0.04 |
| 4 | 1038 | 1.17 |

EXAMPLE 5

A dispersion of methylmethacrylate was produced according to the method described in example 1 which exhibited the following properties: Viscosity number 326 ccm/g, particle size 173 nm, solid content 48.4%. This dispersion was post-catalyzed with 0.016% by weight (relative to solid content) sodium peroxodisulfate. The post-catalysis tire was 120 min. The data in table 3 shows that a constant residual monomer content had been reached after 1 hour already and that further heating was not necessary. The dispersion of example 5 was tested to see how an increase of the entry temperature, compared to that of examples 1 and

TABLE 1

| | Dispersion | | Spray Drying | | Residul | | |
| --- | --- | --- | --- | --- | --- | --- | --- |
| Reference Example | Residual MMA Content (ppm) | Particle Size (nm) | Entry Temperature (°C.) | Exit Temperature (°C.) | MMA-Content (ppm) | Flow Time (sec) | REM Vitrified/ Nonvitrified |
| 2 | 1962 | 219 | 190 | 76 | 1758 | 80 | Nonvitrified |
| 2 | 1962 | 219 | 190 | 115 | 61 | 84 | Nonvitrified |
| 3 | 975 | 178 | 190 | 70 | 808 | 109 | Nonvitrified |
| 3 | 975 | 178 | 190 | 110 | 31 | 119 | Nonvitrified |

MMA = Methylmethacrylate 2, effected the residual monomer content. The results in table 4 show that it is possible to spray-dry at an elevated entry temperature and nevertheless get powders poor in residual monomers at exit temperatures of 115°–125° C. The elevated entry temperature has the advantage, as is known to the expert in the art, that a higher throughout can he run during spray drying.

that the residual monomer content of the dispersion can be distinctly reduced by means of the introduction of water vapor and the distilling off of water/monomer vapors. The residual monomer content of the dispersion is very low with 380 ppm; however, long introduction times were necessary. The residual monomer content in the spray-dried powder was 16 ppm at an exit temperature of 116° C.

TABLE 5

| Example | Dispersion Time (min) | Residual MMA Content (ppm) | Particle Size (nm) | Spray Drying | | Residul MMA Content (ppm) |
| --- | --- | --- | --- | --- | --- | --- |
| | | | | Entry Temperature (°C.) | Exit Temperature (°C.) | |
| 6 | 6 | 1274 | 208 | | | |
| | 140 | 467 | | | | |
| | 200 | 380 | | 90 | 90 | 161 |
| | | | | 190 | 116 | 16 |

TABLE 3

| Example | Post-Catalysis (min) | Residual MMA Content (ppm) |
| --- | --- | --- |
| 5 | 0 | 3719 |
| | 27 | 2105 |
| | 60 | 1073 |
| | 90 | 1090 |
| | 120 | 1054 |

TABLE 4

| Example | Entry Temperature (°C.) | Exit Temperature (°C.) | Residual MMA Content (ppm) | Flow Time (sec.) | Vitrified/Nonvitrified |
| --- | --- | --- | --- | --- | --- |
| 5 | 220 | 115 | 41 | 82 | Nonvitrified |
| | 220 | 120 | 26 | 74 | Nonvitrified |
| | 220 | 125 | 26 | 52 | Starting to be vitrified |
| | 220 | 130 | 31 | 60 | Vitrified |

EXAMPLE 6

A dispersion of methylmethacrylate was produced according to the method described in example 1 which exhibited the following properties: Solid content 49.4%, viscosity number 301 ccm/g, particle size 208 nm. Water vapor was introduced into this dispersion for 3 hours and 20 minutes and water/monomer vapors distilled off. Low-pressure vapor was introduced into the dispersion with the aid of a tube on the end of which a distributor unit for water vapor was attached. Before the introduction of vapor, commercially available defoamer (silicic-acid-modified silicon oil as 17% aqueous dispersion, defoamer G. Degussa company, 0.3% by weight relative to solid) was added to the dispersion in order to suppress foaming. The vapor pressure was 1.2–1.7 bar. A part of the vapor condensed into the dispersion so that the solid content dropped from 49.4 to 47.5% by weight. Table 5 shows that the residual monomer content of the dispersion was lowered after 3 hours and 20 minutes to 380cm. This dispersion was spray-dried; the residual-monomer values are listed in table 5. It can be seen

EXAMPLE 7

A dispersion of methylmethacrylate was produced in conformity with example 1 which exhibited the following properties: Residual MMA content 2007 ppm, solid content: 49.3%, viscosity number 280 ccm/g, particle size 183 nm. In order to arrive at distinctly shorter times for the introduction of the water vapor, both the reactor and the supply lines and outlet lines were thermally insulated. This made it possible to reduce the residual monomer content of the dispersion to very low values in a rather short time. After 70 minutes the residual MMA content of the dispersion was 280 ppm and after 120 minutes the residual MMA content of the dispersion was 232 ppm. This dispersion, which was poor in residual monomers, was spray-dried under the conditions indicated in table 6. It turned out that even dispersions which were very poor in residual monomers must be dried at elevated exit temperatures in order to obtain the required residual monomer contents in the powder. At 116° C. exit temperature the residual MMA content was 15 ppm.

EXAMPLE 8

A dispersion of methylmethacrylate was synthesized according to the method shown in example 1 which exhibits the following properties: Solid content 49.4% by weight, viscosity number 301 ccm/g, particle size 212 nm, residual monomer content 1367 ppm. 0.3% by weight commercially available defoamer (silicic-acid-modified silicon oil, defoamer G, Degussa company, as 17% aqueous dispersion) was added into this dispersion and the degree of filling of the reactor was reduced to 66%. A vacuum of 200–300 hPa was applied and a water/monomer mixture distilled off for 95 minutes. The residual monomer contents of the dispersion and of the spray-dried powders are collated in table 6. It can be seen that elevated exit temperatures during spray drying are necessary even after distilling in order to achieve low residual monomer contents. The residual monomer content in the powder met the required value with 23 ppm.

EXAMPLE 9

A dispersion of methylmethacrylate was produced as described in example 1 which exhibited the following properties: Viscosity number 289 ccm/g, solid content of the dispersion 50.1%, particle size of the dispersion particles 214 nm, residual monomer content 1341 ppm. In this experiment water vapor was introduced and a vacuum applied. The introduction of water vapor was carried out as in example 6. After 115 minutes there was a dispersion exhibiting a residual monomer content of 354 ppm residual monomer. Table 6 lists the results. Spray drying at elevated exit temperature resulted in residual monomer contents of 20 ppm residual MMA.

EXAMPLE 11

Starting with the performance of the experiment in example 1, a dispersion of methylmethacrylate (90 parts) and n-butylmethacrylate (10 parts) was produced. This dispersion had the following properties: Solid content 48.5%,

TABLE 6

| Example | Dispersion Time (min) | Residual MMA Content (ppm) | Particle Size (nm) | Spray Drying Entry Temperature (°C.) | Spray Drying Exit Temperature (°C.) | Residul MMA Content (ppm) |
|---|---|---|---|---|---|---|
| 7 | 0 | 2007 | 183 | — | — | — |
|   | 70 | 280 | 183 | — | — | — |
|   | 120 | 232 | 183 | 190 | 90 | 107 |
|   |   |   |   | 190 | 116 | 15 |
| 8 | 55 | 855 | 212 | — | — | — |
|   | 95 | 545 | 212 | 190 | 116 | 23 |
| 9 | 35 | 626 | 214 | — | — | — |
|   | 115 | 354 | 214 | 190 | 116 | 20 |

EXAMPLE 10

A dispersion of methylmethacrylate (80 parts) and n-butylmethacrylate (20 parts) was produced in accordance with the method in example 1. This dispersion had the following properties: The viscosity number was 319 ccm/g, the particle size was 290 nm, the solid content was 54.5%. The glass transition temperature was 108° C. The residual monomer content had been lowered by the introducing of water vapor—as described in example 7—and achieved a value of 545 ppm methylmethacrylate and 302 ppm n-butylmethacrylate after 100 minutes of introduction of vapor. Table 7 indicates the results of residual monomer determination under the particular drying conditions. It can be clearly seen that under the drying conditions which were used in the above examples the required, low residual monomer values could not be achieved. The difficultly volatile n-butylmethacrylate (boiling point: 163° C. had hardly been passed off. Even methylmethacrylate was still clearly more contained than in examples 2–9. The REM photographs of the powder particles show that the particles sinter together on the surface, that is, vitrify. The flow time is distinctly shortened, which is likewise evaluated as a sign of vitrification. The individual test data is listed in table 7. It is more difficult for residual monomer to be expelled from the larger dispersion particles—see particle size—of the dispersion of example 10 than from the smaller dispersion particles of examples 2–9. If the powder particles sinter together more strongly during spray drying, residual monomer can be expelled less easily from the interior of the powder particles.

particle size 244 nm, viscosity number 354 ccm/g. This dispersion was post-catalyzed with 0.016% by weight (relative to solid) sodium peroxodisulfate for 1 hour at 90° C. The dispersion poor in residual monomers was then spray-dried under the conditions indicated in table 8. It can be seen from the data indicated that it is not possible to produce powders sufficiently poor in residual monomers which are not vitrified at the same time and thus have poorer properties in application technology. Products which are starting to become vitrified are achieved at exit temperature 115° C. already which exhibit a shorter flow time and REM photographs (not attached) show that the particle surface is sintered together.

TABLE 7

| Example | Dispersion Time (min) | Residual MMA-Content (ppm) | Residual n-BMA-Content (ppm) | Particle Size (nm) | Spray Drying Entry Temperature (°C.) | Spray Drying Exit Temperature (°C.) | Residual MMA-Content (ppm) | Residual n-BMA-Content | Flow Time (sec.) | REM Vitrified/ Nonvitrified |
|---|---|---|---|---|---|---|---|---|---|---|
| 10 | 100 | 545 | 302 | 290 | 190 | 75 | 195 | 384 | 127 | Nonvitrified |
|    | 100 | 545 | 302 | 290 | 190 | 116 | 55 | 200 | 74 | Vitrified |

TABLE 8

| Example | Entry Temperature (°C.) | Exit Temperature (°C.) | Residual MMA Content (ppm) | Residual n-BMA Content (ppm) | Flow Time (sec.) | REM Vitrified/ Nonvitrified |
|---|---|---|---|---|---|---|
| 11 | 190 | 75 | 576 | 181 | 85 | Nonvitrified |
|  | 190 | 95 | 189 | 105 | 73 | Nonvitrified |
|  | 190 | 115 | 127 | 73 | 48 | Starting to be vitrified |
|  | 190 | 125 | 20 | 33 | 49 | Vitrified |

EXAMPLE 12

A dispersion of methylmethacrylate (97 parts) and n-butylmethacrylate (3 parts) was prepared analogously to the experimental details in example 1. This dispersion had the following characteristic data: Solid content 49.7%, viscosity number 371 ccm/g, particle size 229 nm. This dispersion was post-catalyzed at 90° C. for one hour with 0.016% by weight (relative to solid content) with sodium peroxodisulfate. Subsequently, this dispersion poor in residual monomers was spray-dried under the drying conditions indicated in table 9. The powder dried at an exit temperature of 125° C. still has 39 ppm total residual monomer content and is already vitrified, which can be clearly recognized from, a REM photograph (not attached) and the distinctly shortened flow time.

TABLE 9

| Example | Entry Temperature (°C.) | Exit Temperature (°C.) | Residual MMA Content (ppm) | Residual n-BMA Content (ppm) | Flow Time (sec.) | REM Vitrified/ Nonvitrified |
|---|---|---|---|---|---|---|
| 12 | 190 | 75 | 1003 | 123 | 96 | Nonvitrified |
|  | 190 | 95 | 407 | 71 | 90 | Nonvitrified |
|  | 190 | 115 | 53 | 20 | 66 | Nonvitrified |
|  | 190 | 125 | 21 | 18 | 47 | Vitrified |

EXAMPLE 13

In order to test how vitrified powder particles behave during processing in hard PVC recipes a copolymer of methylmethacrylate (80 parts) and n-butylmethacrylate (20 parts) with a viscosity number of 308 ccm/g, a bulk density of 477 g/l and a glass temperature of 108° C. was tempered at 95° C. for 0.5 and 1 hour in a drying oven. A further specimen was tempered in a drying oven for 0.5 and 1 hour at 120° C. That is, this product was thermally treated once above and once below the glass temperature. The property changes observed are listed in table 10.

The specimen which had been tempered above the glass temperature is completely vitrified, that is, the powder particles sintered together into themselves. This can be recognized by REM photographs of the powder particle surface. Moreover, the flow time of the powder is clearly shortened by the vitrification.

The wetting angle of repose of the powder—determined in a Pharma testing device—rises from 28 to 32.

EXAMPLE 14

In order to examine the processing behavior of the vitrified powder, 4 parts of the tempered powders of example 13 were worked into the subsequently described PVC test recipe. 2500.0 g of a PVC powder (Vinnol® H 65 D, Wacker company), 150.0 g calcium carbonate (Omyalite® 95 T, Omya company), 100.0 g titanium dioxide (Kronos® Cl 220), 125.0 g barium/cadmium stabilizer (Bäropan® E 16435 FP, Bärlocher GmbH) are processed in a fluid or blade mixer (heating-cooling mixer)to a PVC dry blend. The individual raw materials are placed into the mixer and the mixture heated at a high speed of the fluid mixer to 120° C. mass temperature. The mixture is cooled off at a low speed below 40° C. mass temperature and the mixer is then emptied. 100 parts by weight of the test recipe produced in this manner were mixed with 4 parts of the powders described in example 13 on a roller mill and gelled in a commercially available measuring kneader at a housing temperature of 170° C. and a speed of 50 rpm. "Gelling" means that the powder mixture is converted under the influence of shearing and heat from a powdery consistency to a compact, solid material. The term "gelling time" signifies the time from the start of measuring to the maximum torque of the registered torque curve. It can be clearly recognized (see table 10) that tempering above the glass temperature of the PVC processing aid results in longer gelling times of the PVC dry blend.

TABLE 10

| Example | Drying Temperature (°C.) | Time (min) | Gelling Time (min) | Flow Time (sec) | REM (30,000 times) Vitrified/ Nonvitrified |
|---|---|---|---|---|---|
| 13/14 | 75° C.; (exit temperature - spray dried) | — | 3,4 | 236 ± 44 | Nonvitrified |
|  | 95° C., tempered | 30 | 3,4 | 196 ± 14 | Nonvitrified |
|  | 95° C., tempered | 60 | 3,7 | 179 ± 5 | Nonvitrified |
|  | 120° C., tempered | 30 | 4,6 | 138 ± 12 | Vitrified |
|  | 120° C., tempered | 60 | 4,8 | 120 ± 12 | Vitrified |

EXAMPLE 15

In order to check whether spray-dried emulsion polymerizates in accordance with the invention from examples 2–9 showing high glass transition temperatures exhibit sufficient processing behavior the processing behavior was examined in a test recipe typical for possible applications. PVC dry blends were produced in a heating-cooling mixer as described in example 14 from the following raw materials: 2000.0 g PVC powder (Solvic® 258 RB, Solvay company), 160.0 g methylmethacrylate butadiene styrene graft polymerizate (Paraloid® BTA III F, Rohm and Haas company), 24.0 g glycerol ester (Bärolub® L-CD, Bärlocher GmbH company), 8.0 g lubricant (Hoechst wax E, Hoechst company), 1.0 g oxidized polyethylene was (Bärolub® PA special, Bärlocher GmbH company), 30.0 g tin stabilizer (Okstan® OM 100, Bärlocher GmbH company) and 3 parts of the following commercial processing aids in accordance with the invention: Paraloid® K120 N, Bärorapid® 3FK and polymers in accordance with the invention from example 6.

These PVC dry blends were measured in a commercially available measuring kneader under the following conditions: Housing temperature: 140° C., 30 rpm, measuring range 50 Nm, specimen weight 31 g. The results are listed in table 11.

It can be recognized that the gelling times of the emulsion polymerizates of the invention are comparable to those of commercially available PVC processing aids, even though the glass transition temperature—measured by means of DSC—for the emulsion polymerizates of the invention is clearly higher than for the commercial processing aids mentioned above. The equilibrium torque, which can be taken as a measure for the melting viscosity, is almost identical for all products tested. The term "equilibrium torque" signifies the torque Md approximately 10 minutes after the start of measuring when the torque curve is constant. These results show that even the emulsion polymerizates of methylmethacrylate of the invention can be used as PVC processing aids in spite of clearly higher class temperature. Table 11 also lists results from experiments with commercially available measuring extruders. The torque and the output are almost identical for the products examined. This also shows that the emulsion polymerizates of the invention are up-to-standard PVC processing aids.

FID backflush-precut) was used for the measurements. The GC oven temperature was 103° C. and the ISO time was 41.8 minutes. The injector temperature was 170° C. The carrier gas was nitrogen. The solvent is washed back by backflush technology.

Pharma Test

In order to determine the flow time and the angle of repose of powdery, flowable bulk goods the Pharma-Test device type PTG of the Pharma Test Gerätebau GmbH company is used. The measuring funnel is filled with the powder to be examined. After the activation of a slide plate the powder flows through a nozzle with a diameter of 10 mm onto a balance scale and is collected there. The time which the powder requires to run out of the funnel is determined by an electronic measuring device. The angle of repose of the powder can also be determined from the level of the bulk cone via a light barrier.

Glass Transition Temperature; Tg Value

The glass transition temperature also Tg value is determined by differential thermoanalysis. The DTA measurements were carried out with a DTA device of the Mettler company. Type: Measuring cell DSC 30. The heating rate was 20° C./minute if not otherwise indicated.

Scanning Electron Microscope; Determination of the Vitrification of Powder Particles.

The electron-microscope photographs were carried but with a JSM 6400 device of the Jeol company. For preparation of the specimens the powders indicated in the examples were placed on a conductive, adhesive ground and sputtered with gold. These powders were then examined with enlargements of 5,000–30,000. The vitrified powder particles can be unambiguously recognized by virtue of the fact that the surface of the powder particle is sintered together, that is, has a cohesive, smooth surface whereas in the case of non-vitrified powder particles the primary particles from the dispersion, which congregate during the spray drying to the powder particles, can be clearly recognized. The surface of non-vitrified powder particles is not sintered together.

TABLE 11

| | | | | | Measuring Kneader | | Extruslograph | |
|---|---|---|---|---|---|---|---|---|
| | Entry | Exit | Residual | Tg-Value | Gelling | Md | | |
| Example/ Product | Temperature (°C.) | Temperature (°C.) | MMA-Content (ppm) | (DSC) (°C.) | Time (min) | (10 min) (Nm) | Md (mp) | output (g/min) |
| 6 | 190 | 90 | 161 | 126 | 1,6 | 19,4 | 7100 | 21,1 |
| 6 | 190 | 116 | 16 | 126 | 1,1 | 19,4 | 7450 | 21,0 |
| Paraloid K120N | — | — | — | 102 | 2,0 | 19,2 | 7150 | 21,6 |
| Bärorapid 3FK | — | — | — | 105 | 1,1 | 19,6 | 7450 | 20,9 |

Test Methods Used

Head-Space Gas Chromatography:

The residual monomer values indicated in the text were determined according to the "head-space gas chromatography" method. The aqueous dispersion or the powdery PVC processing aid is dissolved in dimethyl formamide, in which the internal standard n-butylacetate is present at the same time, in a closed specimen bottle. The mixture is tempered for 30 minutes at 120° C.; the equilibrium is established thereby between liquid and gaseous chase. After adjustment of the equilibrium the gaseous phase is injected into the gas chromatograph. The separation of the residual monomer takes place on a ⅛" temperature-linear Carbowax 20 M column. FID serves as detector. The evaluation takes place according to the internal standard method (ISTD). A commercially available GC (Perkin-Elmer HS 101, GC 8500

Further embodiments and advantages of the invention result from the following claims.

We claim:

1. A method of producing non-vitrified homo- or copolymerizates of methylmethacrylate with a lowered residual monomer content of less than or equal to 100 ppm, comprising subjecting an emulsion polymerizate which contains methylmethacrylate and, optionally, up to 50% by weight of a comonomer to post-catalysis wherein the residual monomer content is lowered by a subsequent addition of polymerization initiator and heating and subsequently spray-drying at a temperature which is above the boiling point of methylmethacrylate or, if it is higher, above the boiling point of the optionally added comonomer.

2. The method according to claim 1, wherein the comonomer has a boiling point under normal pressure of 1013 hPa under the glass transition temperature of the copolymerizate.

3. The method according to claim 2, wherein the comonomer is present and has a boiling point of (Tg–X)°C. wherein Tg is the glass-transition temperature of the copolymerizate in °C. and the numerical value of X $\geq$ 20.

4. The method according to claim 1 wherein the spray drying is carried out at a spray-drying exit temperature of (Tg–Y)°C. wherein Tg is the glass transition temperature of the homo- or copolymerizate in °C. and the numerical value of Y is between 2 and 30.

5. The method according to claim 1 wherein the post-catalysis is carried out for at least 0.5 h.

6. The method according to claim 2, characterized in that a comonomer is used with a boiling point of (Tg–X)°C. wherein Tg is the glass-transition temperature of the copolymerizate in °C. and the numerical value of X is between 5 and 20.

7. The method according to claim 1 wherein the spray drying is carried out at a spray-drying exit temperature of (Tg–Y)°C. wherein Tg is the glass transition temperature of the homo- or copolymerizate in degrees C and the numerical value of Y is between 5 and 15.

8. The method according to claim 1 wherein the post-catalysis and the spray drying result in a residual monomer content of the homo- or copolymerizate of between 30 and 100 ppm.

9. The method according to claim 1 wherein the post-catalysis is carried out between 0. 5 h and 3 h.

* * * * *